(No Model.)

P. MURRAY, Jr.
AUTOMATIC FAN.

No. 332,820. Patented Dec. 22, 1885.

WITNESSES
A. Schehl.
Martin Petry.

INVENTOR
Peter Murray jr.
By his Attorneys

UNITED STATES PATENT OFFICE.

PETER MURRAY, JR., OF NEWARK, NEW JERSEY, ASSIGNOR TO HIMSELF AND ALFRED N. LEWIS, OF SAME PLACE, AND RICHARD S. T. CISSEL AND ROBERT B. CISSEL, OF ELIZABETH, NEW JERSEY.

AUTOMATIC FAN.

SPECIFICATION forming part of Letters Patent No. 332,820, dated December 22, 1885.

Application filed September 17, 1885. Serial No. 177,315. (No model.)

*To all whom it may concern:*

Be it known that I, PETER MURRAY, Jr., of Newark, in the county of Essex and State of New Jersey, have invented certain new and useful Improvements in Automatic Fans, of which the following is a specification.

The fan-shafts heretofore employed in offices, counting-rooms, restaurants, &c., for agitating the air and keeping off the flies, were objectionable on account of their unattractive, machine-like appearance, which was not in keeping with the fixtures and furniture of the rooms referred to.

The object of this invention is to substitute for the plain fan heretofore in use an agitating device that keeps the air in motion while presenting a more pleasing appearance to the eye; and the invention consists of a rotating fan-shaft, a hollow body placed loosely on said shaft, oscillating wings actuated by a wave-wheel on the shaft, and of a clutch mechanism whereby the body is thrown in or out of gear with the rotating shaft. The clutch mechanism consists of fulcrumed levers, that are connected by lever-rods with a loose collar turning on a sleeve of the fan-shaft, said sleeve being set higher or lower and secured by a locking device, as will appear more fully hereinafter, and finally be pointed out in the claims.

Figure 1:
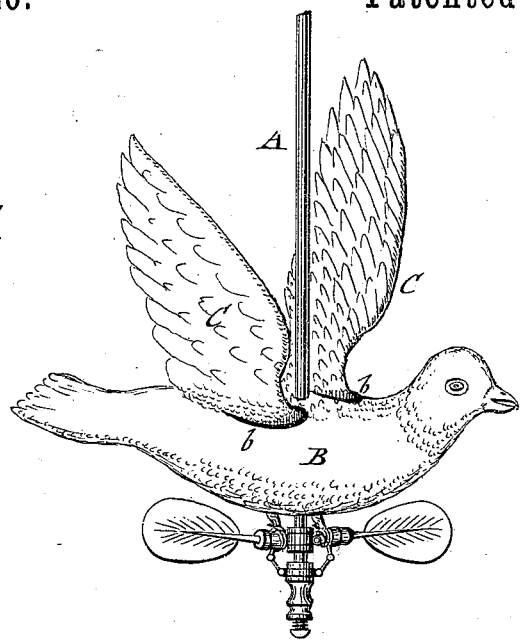
Figure 2:
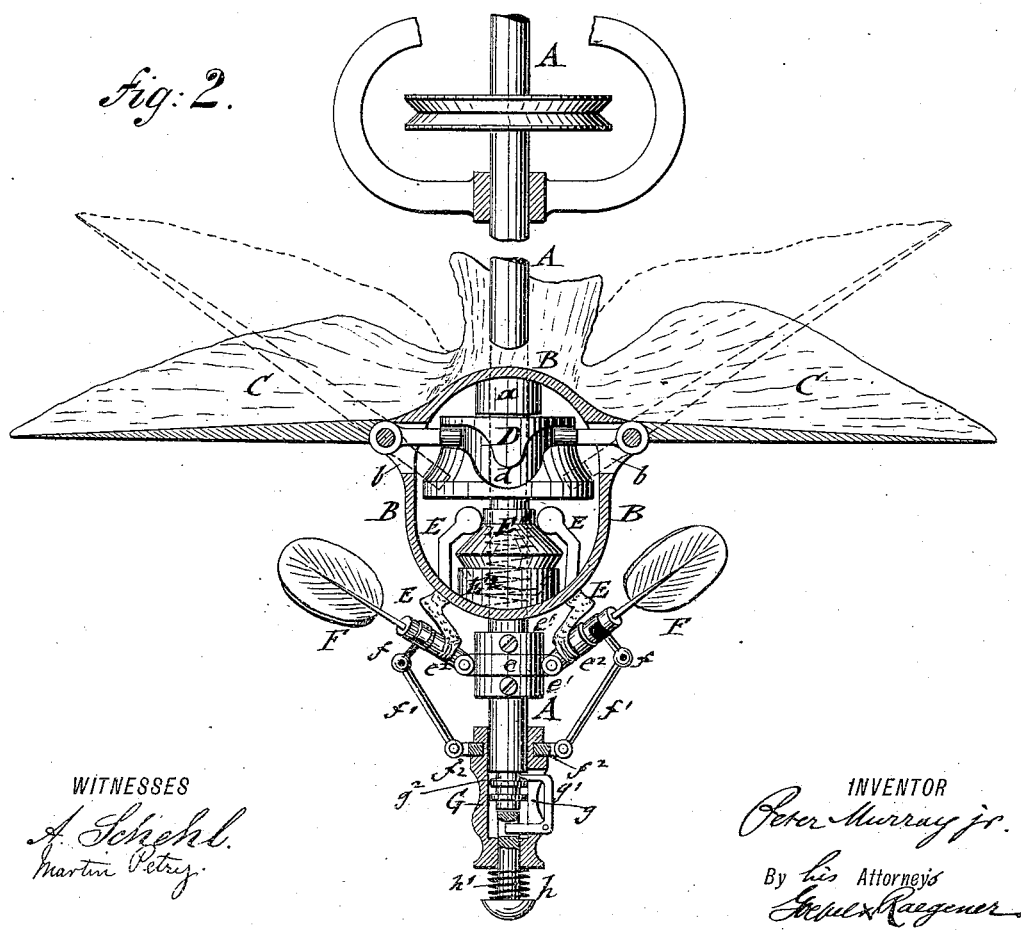

In the accompanying drawings, Figure 1 represents a perspective view of an automatic fan-shaft of my improved construction. Fig. 2 is a vertical central section of the same, showing the working parts of the fan-shaft.

Similar letters of reference indicate corresponding parts.

The fan-shaft A is supported in bearings of suitable hangers or brackets and rotated continuously by a belt-and-pulley transmission, as customary in fans of this class.

In place of the ventilating fan, that is applied by its hub loosely to the shaft A, a hollow sheet-metal body, B, with oscillating wings C C may be used. The body B is made in the shape of a bird or any other suitable object and hung loosely to a fixed collar, $a$, of the shaft, so as not to turn therewith, except when it is thrown by a suitable friction-clutch into gear with the shaft A. The oscillating wings C are fulcrumed to horizontal openings $b\ b$ in the sides of the body B, and actuated so as to move up and down, in imitation of the motion of a bird's wings, by means of a wave-wheel, D, that is keyed to the shaft A, and provided with a wave-like groove, $d$, for engaging the inner arms of the wings C, the ends of which may be provided with anti-friction rollers, so as to decrease the friction with the wave-wheel D.

Any suitable clutch mechanism may be employed for throwing the rotating fan-shaft in or out of gear with the body B, so as to cause the wings C either to oscillate up and down and set thereby the air in motion, as shown in Fig. 2, or to retain them in a position of rest, as shown in Fig. 1. I prefer, however, to employ the clutch mechanism shown in my application for Letters Patent for automatic fans, filed August 1, 1885, Serial No. 173,216.

The clutch mechanism consists of two clutch-levers, E, which are fulcrumed to a loose collar, $e$, that is retained between fixed collars $e'\ e'$ of the shaft. The lower ends of the clutch-levers E are made in the shape of bird's feet, holding sockets $e^2$, into which are inserted smaller auxiliary fans F, that are adjusted axially, as well as higher or lower, by means of crank-arms $f$, which are rigidly attached to the shanks of the fans F, and connected by pivoted lever-rods $f'$ with a collar, $f^2$, that turns loosely in an annular groove of a vertically-adjustable sleeve G, located at the lower end of the fan-shaft A. The sleeve G is provided with a slot, $g$, through which passes a fulcrumed U-shaped pawl, $g'$, the lower end of which is engaged by the upper slotted end of the shank of a handle, $h$, between which and the lower end of the sleeve G a spiral spring, $h'$, is interposed. The upper end of the pawl $g'$ engages one of the annular notches $g^2$ of the fan-shaft, and is retained in the notch by the pressure of the spring $h'$. By pressing the handle $h$ in upward direction, the pawl $g'$ is released from the notch of the shaft A, and thereby the sleeve G set higher or lower on the same. This produces also the axial turning of the fans F F to a different angle toward the shaft, while the motion of the fans produces the upward motion of the clutch-levers E and the operation of the main fan, as the clutch-levers press a sliding conical sleeve, E', against the tension of an interior spiral spring against a beveled flange, E², at the lower part of the body B, whereby the latter is locked to the shaft and rotated therewith. The greater the pressure of the clutch-levers on the conical sleeve E' the greater will be the friction with the flange E², so that gradually the tight clutching of the body B by the rotating shaft takes place until the body rotates finally at the same speed therewith. The quicker the motion of the body B the slower will be the oscillating motion of the wings, until the wings are finally held in a horizontal position of rest, when the body and shaft rotate at the same speed, so as to give the impression of a bird soaring in the air. When the body is so clutched on the shaft as to rotate at a considerably slower motion than the latter, then the flapping motion of the wings takes place quickly, owing to the action of the quickly-rotating wave-wheel on the inner ends of the wings of the slowly-rotating body B. The axial adjustment of the fans F F assists in setting the clutch mechanism of the body B to the position required by the greater or less resistance to the air, said resistance being smallest when the fans are in horizontal position, and greatest when they are in a vertical position.

Having thus described my invention, I claim as new and desire to secure by Letters Patent—

1. The combination of a rotary fan-shaft, a hollow body placed loosely on the same, wings fulcrumed in side openings of said body, a wave-wheel on the shaft engaging the inner ends of the wings, and a clutch device whereby the body is thrown in or out of gear with the shaft, substantially as set forth.

2. The combination, with a rotary fan-shaft, a hollow body placed loosely on the same, wings fulcrumed to side openings of the body, a wave-wheel on the shaft engaging the inner ends of the wings, a clutch mechanism for throwing the shaft in or out of gear with the body, auxiliary fans set into sockets of the clutch-levers, a slide-sleeve, and levers for setting said auxiliary fans and the clutch device while the fan-shaft is in motion, substantially as set forth.

In testimony that I claim the foregoing as my invention I have signed my name in presence of two subscribing witnesses.

PETER MURRAY, Jr.

Witnesses:
PAUL GOEPEL,
SIDNEY MANN.